United States Patent
Draese et al.

(10) Patent No.: US 7,797,347 B2
(45) Date of Patent: Sep. 14, 2010

(54) WORKLOAD AWARE CHECKING OF DATABASE REORGANIZATION

(75) Inventors: Oliver Draese, Holzgerlingen (DE); Namik Hrle, Boeblingen (DE); Torsten Steinbach, Holzgerlingen (DE); Michael Jeffrey Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/944,865

(22) Filed: Nov. 26, 2007

(65) Prior Publication Data
US 2008/0235183 A1    Sep. 25, 2008

(30) Foreign Application Priority Data
Mar. 21, 2007 (EP) ............................ 07104537

(51) Int. Cl.
*G06F 17/30* (2006.01)

(52) U.S. Cl. ................ 707/796; 707/688; 707/696

(58) Field of Classification Search ............ 707/1–10, 707/100, 101, 103 R, 104.1, 200, 204, 205; 711/154, 156, 165
See application file for complete search history.

(56) References Cited

U.S. PATENT DOCUMENTS

| | | | | |
|---|---|---|---|---|
| 6,944,630 | B2 * | 9/2005 | Vos et al. | 707/104.1 |
| 6,963,959 | B2 * | 11/2005 | Hsu et al. | 711/165 |
| 7,305,379 | B2 * | 12/2007 | Goyal et al. | 707/2 |

OTHER PUBLICATIONS

"REORGCHK command", http://publib.boulder.ibm.com/infocenter/db2luw/v9/topic/com.ibm.db2.udb.admin.doc/doc/r0001971.htm, last updated Oct. 4, 2007, 6 pages.

* cited by examiner

*Primary Examiner*—Cam-Linh Nguyen
(74) *Attorney, Agent, or Firm*—Francis Lammes; Stephen J. Walder, Jr.; Elissa Y. Wang (57) ABSTRACT

The present solution addresses the need to carry out reorganization of a database storage. A statistics-based reorganization check procedure is performed on at least first database tables and indexes, resulting in a preliminary reorganization recommendation. Information on workload on tables and indexes of said database storage is received. Based on the information on workload and the preliminary reorganization recommendation, it is decided whether to carry out reorganization of the database storage in accordance with the preliminary reorganization recommendation.

18 Claims, 7 Drawing Sheets

PRIOR ART

WORKLOAD AWARE CHECKING OF DATABASE REORGANIZATION

1. BACKGROUND OF THE INVENTION

1.1. Field of the Invention

The present invention relates to the field of electronic database management, and in particular to a method for increasing the performance of said database.

1.2. Description and Disadvantages of Prior Art

Electronic database systems store data information usually in a plurality of memories sections which are located in physical storage subsequent to each other. For example, in IBM relational and database technology those sections are so called "pages", where in a page usually contains 0 or more table rows. On a logic level, several rows build up a table and several tables build up the table space which is managed as a set of single large binary files or a subdirectory structure respectively.

During usage of the database read, write and delete processes are directed to particular fields of a row. A modification of data may cause a non-optimal physical storage image, because for example a deletion of some rows may cause fragmentation problems. Further, for example if a field of a row is updated with a longer text string then originally present, a "over flow record" might be generated, where within the data field a pointer to a new storage location which preserves sufficient storage space, is stored. In such cases a subsequent read operation on the original data field is redirected to the larger data field which results in two separate I/O operations, instead of originally only one I/O operation. So, exhaustive usage of a database may result in a quite fragmented storage image. The more fragmented the storage image is, the higher is the number of redirections. As a consequence, average access times for read and/or write operations are increased relative to an "ideal" state.

Recommendations can be made to reorganize objects in the database, in order to reduce the fragmentation of the storage image. An instructive prior art publication, namely "Database Fragmentation and Disorganization" by Graig S. Mullins published as a DBA Corner column in the Database Trends and Applications magazine in December 2001, may be retrieved from: http://www.craigsmullins.com/dba-corner.htm.

It should be stressed that database reorganization procedures are considered to imply relatively high cost due to required system resources and because in some cases they are performed by professional database management staff.

Most prior art reorganization tools require that the object being reorganized has some period of time of unavailability to the applications. Some prior art reorganizations do even require the object to be unavailable during the entire reorganization process.

Figure 1:
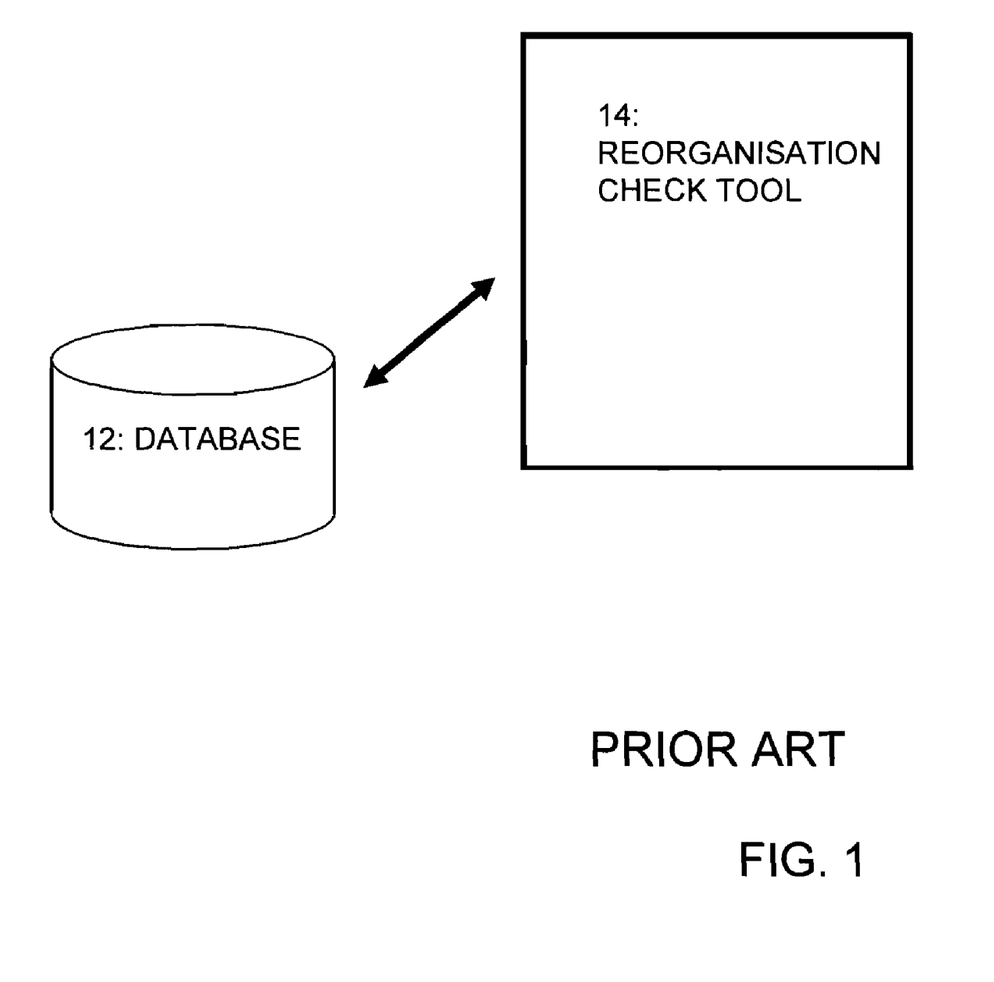
FIG. 1 shows, as an example, structural components of a prior art hardware and software environment used for a prior art method.

As an example of prior art, and with reference to FIG. 1, IBM's existing relational database technology DB2 provides two ways to support the user in decisions about doing the table and index reorganizations. There is the table and index reorganization check procedure CLP utility, i.e. an auxiliary services tool 14 that recommends reorganizations of certain tables and indexes, stored in the database 12. And in addition, DB2 provides the automatic table reorganization feature in a separate tool (not depicted in order to improve clarity) that is even capable of executing the table and index reorganization.

Both tools are based on plain table and index statistical information, i.e., meta data tables, like IBM DB2 CATALOG, which describe the logical and physical structure and properties of the database. This statistical information is not necessarily current because it is only collected on a periodic basis. They use certain formulas to analyze the statistics for indicators that table and index reorganization could be beneficial.

Disadvantageously, a prior art reorganization checking tool 14 is not able to predict that a recommended reorganization will actually have a positive impact on the database performance.

1.3. Objectives of the Invention

The objective of the present invention is to provide a method and system for improved table and index reorganization check procedures.

2. SUMMARY OF THE INVENTION

This objective of the invention is achieved by the features stated in enclosed independent claims. Further advantageous arrangements and embodiments of the invention are set forth in the respective dependent claims.

A first aspect of the invention provides a computerised method for determining whether to carry out reorganization of a database storage, said method comprising the steps of:
  performing a statistics-based reorganization check procedure on at least first database tables and indexes, resulting in a preliminary reorganization recommendation;
  receiving information on workload on tables and indexes of said database storage; and
  determining, based on said information on workload and said preliminary reorganization recommendation, whether to carry out reorganization of the database storage in accordance with said preliminary reorganization recommendation.

The method may further contain at least one, and maybe even all three, of the following steps:
  determining said first database tables and indexes based on a predefined threshold for workload on tables and indexes and said information on workload;
  determining potential effect of said preliminary reorganization recommendation based on said workload on tables and indexes; and
  maintaining information on effect of reorganization of said database storage in accordance with reorganization recommendations under different workload conditions to be used as a basis in deciding whether to carry out a further reorganization in accordance with a further preliminary reorganization recommendation.

The step of determining potential effect of said preliminary reorganization recommendation may comprise at least one of the following:
  checking an overflow reads ratio of said workload, when said preliminary reorganization recommendation is based on an overflow ratio;
  checking number of table scans of said workload when said preliminary reorganization recommendation is based on a used spaced ratio;
  checking number of table scans of said workload when said preliminary reorganization recommendation is based on a used pages ratio; and
  checking according to which index a clustering has most effect on said workload when said preliminary reorganization recommendation is based on a cluster ratio.

The step of determining potential effect of said preliminary reorganization recommendation may comprise at least one of the following:
  checking whether said workload does large leaf scans on the index, when said preliminary reorganization recommendation is based on at least one of the following: used space ratio, pseudo delete ratio, and used leaf ratio; and checking whether a small number of leaf pages are read, when said preliminary reorganization recommendation is based on tree-level-to-space ratio.

A second aspect of the invention provides a database system comprising a reorganization check tool for performing a statistics-based reorganization check procedure on at least first database tables and indexes, resulting in a preliminary reorganization recommendation; and a workload capturing tool for providing information on workload on tables and indexes of said database storage;

wherein said database system is arranged to determine, based on said information on workload and said preliminary reorganization recommendation, whether to carry out reorganization of the database storage in accordance with said preliminary reorganization recommendation.

Also a computer program product comprising a computer useable medium and having a computer readable program is provided.

3. BRIEF DESCRIPTION OF THE DRAWINGS

The present invention is illustrated by way of example and is not limited by the shape of the figures of the drawings in which.

4. DETAILED DESCRIPTION OF THE EMBODIMENTS OF THE INVENTION

The core idea of the present invention is to extend the plain statistics-based prior art table and index reorganization check procedure with additional verifications and correlations and include into this analysis real workload data of the system. The motivation is to recommend only that table and index reorganization that is likely to have a positive impact on the workload on a given system. For example, tables rarely used do not need to be reorganized because the cost of the table and index reorganization may be higher compared to the benefit.

Methods in accordance with embodiments of the invention concentrate on determining a potential impact of a recommended or planned reorganization. According to a preferred feature thereof it is proposed to carry out reorganization only in response to determining that the reorganization has a positive potential impact.

As an additional step it is proposed to identify "important" tables and indexes and to perform a reorganization check only on those important tables and indexes. The term "important" is hereby defined related to the actual workload of the database. The higher workload on a table—in terms of execution time of SQL statements—the more important are assessed the underlying table and indexes.

Figure 2:
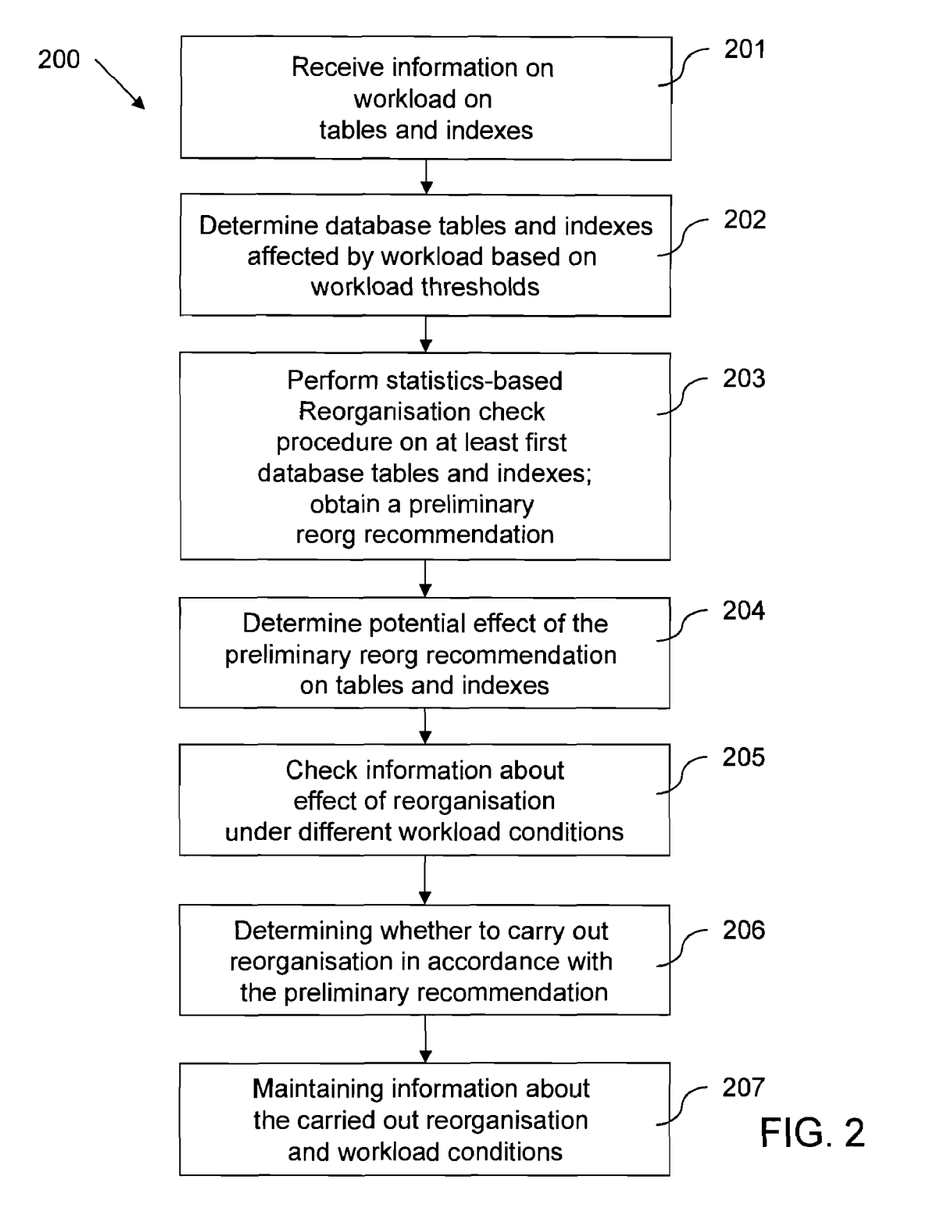
FIG. 2 shows, as an example, a flowchart of a method in accordance with an embodiment of the invention.

FIG. 2 shows, as an example, a flowchart of a method 200 in accordance with an embodiment of the invention. It is appreciated that the steps and the sequence of steps is provided as an example. In other embodiments, the number of steps may be different and the steps may be carried out in a different order.

In step 201, a workload-aware reorganization check tool (see tool 18 in FIG. 3) receives information on workload on tables and indexes of a database storage. In step 202, which is an optional step, the work-load aware reorganisation check tool determines those database tables and indexes, which are affected by workload, based on predefined workload thresholds. In step 203, the work-load aware reorganisation tool performs a statistics-based reorganisation check procedure on at least those database tables and indexes that were identified in step 202. The result of step 203 is a preliminary reorganisation recommendation. The statistics-based reorganisation check procedure in step 203 may be in accordance to prior art.

In an optional step 204, the workload-aware reorganisation check tool determines the potential effect of the preliminary reorganization recommendation on tables and indexes. Further details of this step are discussed below in connection with FIGS. 4 and 5. In a further optional step 205, the workload-aware reorganisation tool checks information on effect of reorganisation under different workload conditions. This information can be collected and maintained, for example, continuously when making database reorganisations in step 207. In step 206, the workload-aware reorganisation tool determines, based on information on workload and the preliminary reorganization recommendation, whether to carry out reorganization of the database storage in accordance with said preliminary reorganization recommendation.

Embodiments of the invention thus comprise a plurality of alternative combinations of the steps 202, 203, 204 and 205 to build up a multi-stage method of enhancing the table and index reorganization recommendations. In the following, the steps 202, 203, 204 and 205 are referred to also as the corresponding stages 1, 2, 3 and 4, where in the first stage important tables and indexes are identified. In the second stage a (prior art) statistics-based table and index reorganization check procedure is performed for obtaining a preliminary reorganization recommendation. In the third stage, a potential table and index reorganization impact analysis is carried out based on various criteria, and in the fourth stage an actual table and index reorganization impact analysis is carried out based on historical information on the effect of reorganisation under different workloads. The aim is to detect, where potential performance increases due to reorganisation can be expected, in order not to omit occasions for potential reorganization success.

The prior art IBM database performance management tool "DB2 Performance Expert" (PE), for example, has the data and infrastructure in place to realize these stages in an appropriate and automated way. It provides means to keep track of workloads over time. PE also has the infrastructure to automatically execute the analysis described in this document. Finally it provides an inherent way to create notifications about DB2.

The skilled reader appreciates that the problem of the prior art approach discussed above is that it does not take into account if the recommended table and index reorganization would really be relevant to the system because it does not analyze the actual workload. Further, prior art does not verify if the database reorganization, once it has been executed, really had a positive effect. Some embodiments of the invention, however, realize a kind of feedback loop, in order to integrate such historic results into the current recommendation procedure.

In summary, the above mentioned stages can be combined in different combinations. Respective different combination result in the following advantages. When stages 1 and 2 are combined, the advantage is to save time for prior art reorganization check procedures, as the check procedure is limited to those tables having high workload. When stages 2 and 3 are combined, the advantage is to detect, where potential performance increases can be expected, such that no occasions for potential reorganization success are omitted. The effect of a combination of stage 1+stage 2+stage 3 relative to stage 2+stage 3 combination is that the relevant evaluation work is limited in advance to those tables having a high workload; this saves computational time.

Figure 3:
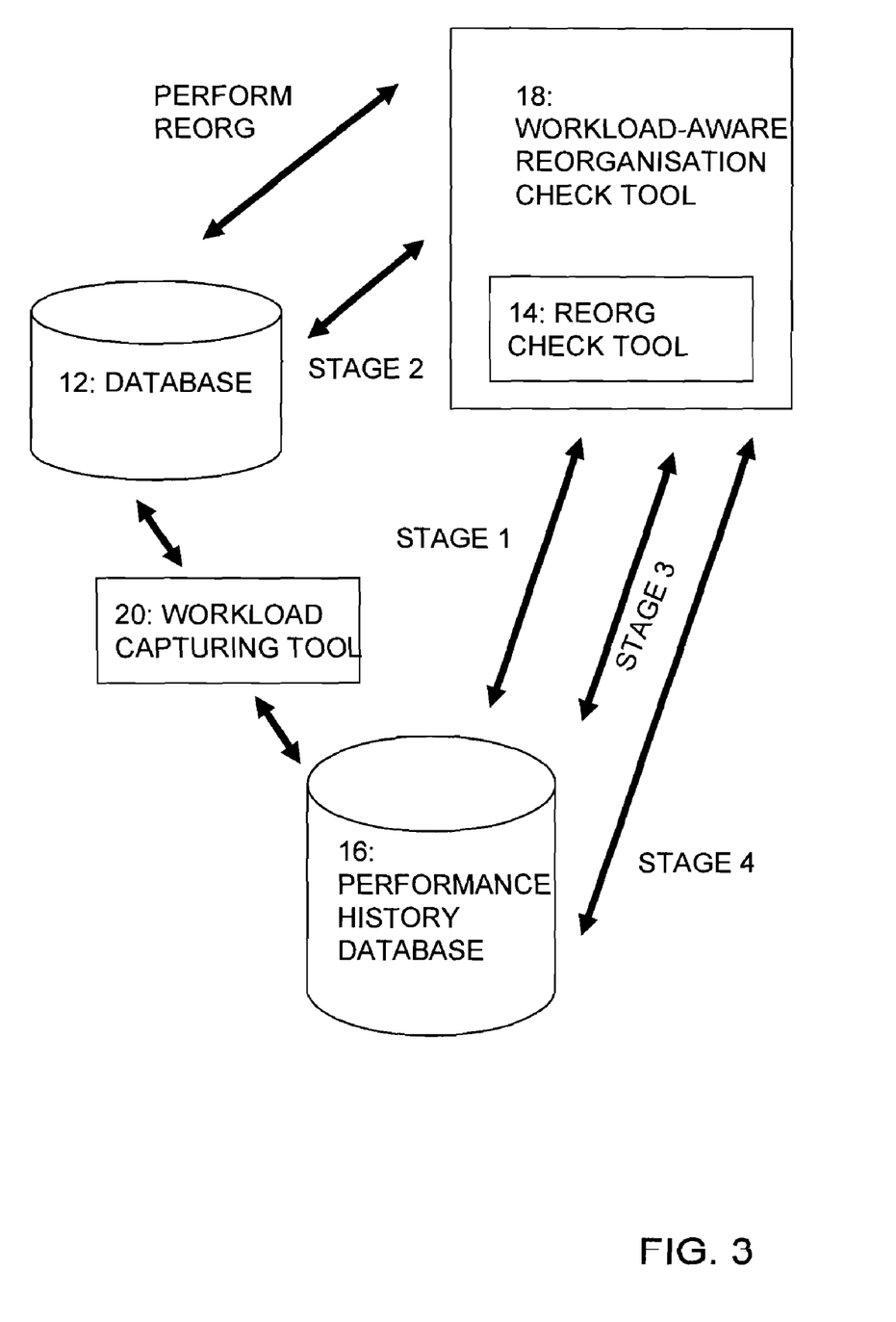
FIG. 3 shows, as an example, structural components of a hardware and software environment used for an embodiment of the invention.

Usually, the information about the workload of the database is available by a respective monitoring tool, such as the workload capturing tool 20 shown in FIG. 3. In IBM DB2 for example, there is for instance the DB2 Performance Expert tool available providing this kind of information. According to FIG. 3, a workload-aware re-organization check tool 18 closely cooperates with a performance history database 16. A performance history database is provided by some prior art database management tool software, or the performance history information may be made available to the tool 18 in some other manner. The performance history database 16 is accessed by the workload aware reorganization check tool 18 in above-mentioned stages 1, 3 and 4. As the performance database 16 is typically an integral part of some prior art databases tool software any software interface between components 18 and 16 is typically specific for any particular database management system. The necessary interfaces between tool 18 and performance history database 16 can generally be provided without major difficulties, because the internal programs structure is open to the development staff. As FIG. 3 shows, a prior art reorganization check tool 14 (or the relevant functionality of such a tool) may form part of the workload-aware reorganization check tool 18.

Figure 4A:
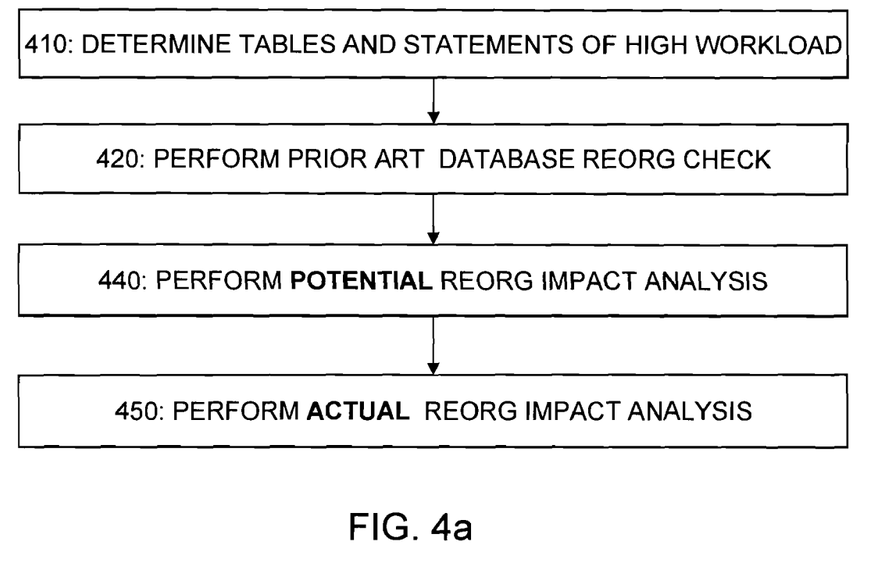
FIG. 4a shows, as an example, the control flow of the most important steps of a first detailed embodiment of the invention.

In the following, some combinations of the stages 1, 2, 3, and 4 are discussed in more detail in connection with FIGS. 4a, 4b, 4c and 4d. Details of the above-mentioned inventive features, the stages 1, 3 and 4, are described in more detail next below and with reference to FIG. 4a, illustrating the control flow of a first detailed embodiment of the invention. The first step 410 identifies important tables and indexes. The workload-aware tool 18 realizes a read access to the historic performance data and analyses the data, in order to determine, which tables are used most and which statements are interesting to be evaluated as "important" for the purposes of the invention.

The criteria for important tables are if a table is used in statements that are executed frequently, or used in statements that need long to execute. The optimal threshold for both criteria is best experienced to be figured out with tests reflecting a specific database and specific usage.

It is further proposed to make these thresholds dynamic, e.g. depending on the size of the window available for the database reorganization.

The second step 420 performs a prior art table and index reorganization check procedure. In FIG. 4a, this step is performed only for tables identified as being important and for tables the indexes of which are identified as being important. In other embodiments, it is possible that this step is performed also for other tables. In step 420 in FIG. 4a it is checked, which of the important tables and indexes the table and index reorganization check procedure recommends to be reorganized and for what reasons, i.e. due to which one of the following table and index reorganization check procedure formulae.

Although checking the criteria for recommending the table and index reorganization are discussed here in connection with FIG. 4a, they apply to any embodiment of the present invention. In the following, reference is made also to FIGS. 5 and 6, which relate to the third stage (steps 204, 440), namely to determining potential effect of a reorganization procedure preliminary recommended in the second stage (steps 203, 420).

Figure 5:
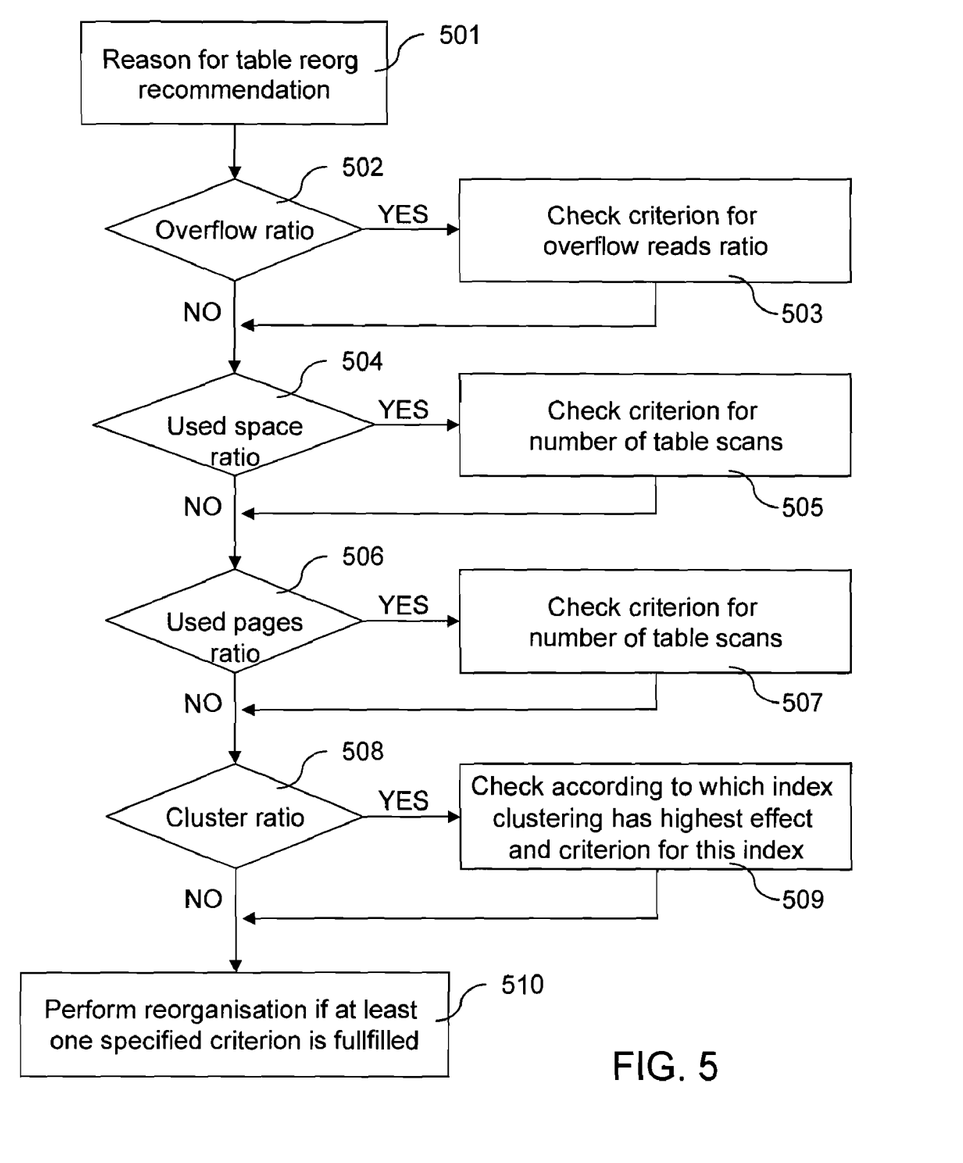
FIG. 5 shows, as an example, logic for analysing, in accordance with an embodiment of the invention, a preliminary reorganization recommendation for a table.

Formulae (criteria) for recommending the table and index reorganization on a table level (step 501) are typically given as ratios. Formula 1 relates to Overflow Ratio (step 502). This formula indicates the percentage of rows of the table stored as Overflow Record and should be less than 5%. Formula 2 relates to Used Space Ratio (step 504). Percentage of allocated space really in use should be more than 68%. Formula 3 relates to Used Pages Ratio (step 506). This formula indicates the percentage of allocated pages really in use and should be more than 80%. Formula 4 relates to Cluster Ratio (step 508). This formula indicates the percentage of rows being stored in sequence on consecutive pages with regard to the sort order of an index. This Formula is evaluated for each index.

Figure 6:
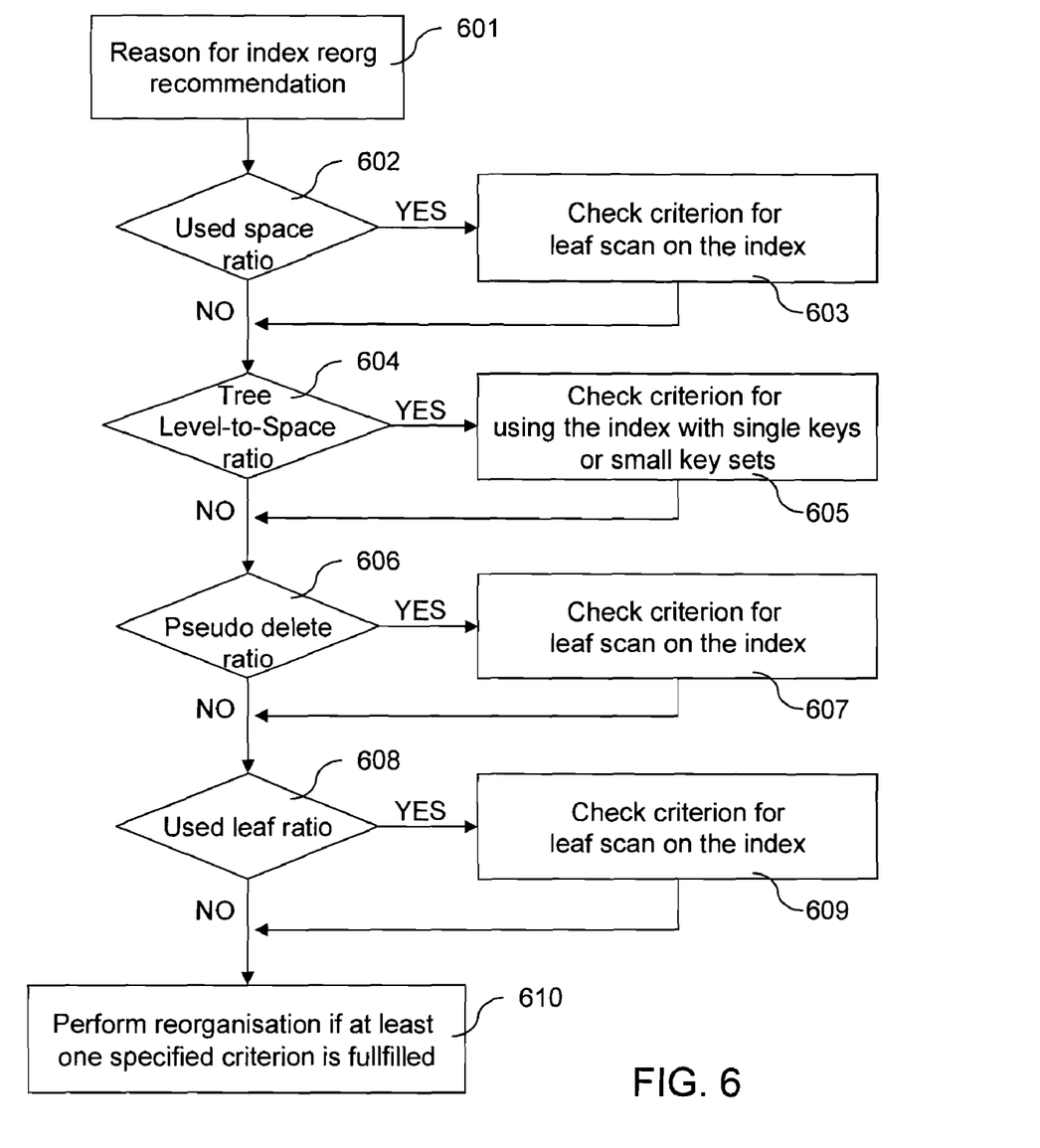
FIG. 6 shows, as an example, logic for analysing, in accordance with an embodiment of the invention, a preliminary reorganization recommendation for an index.

Formulae for recommending an index reorganization (step 601) are as follows. Formula 5 relates Used Space Ratio (step 602). This formula indicates the percentage of allocated index space really in use for index entries; it should be more than 50%. Formula 6 relates to Tree Level-to-Space Ratio (step 604). Indexes are organized in a tree in the storage space, which facilitates the quick traversal of the data structures by just traversing the tree down until the desired concrete index value has been found in a tree leaf. Each tree node can comprise a certain amount of entries in maximum. This formula indicates the percentage of index space that would really be used if the tree had one level less should be higher than 100%. Formula 7 relates to Pseudo Delete Ratio (step 606). It indicates the percentage of index entries being potentially deleted; it should be less than 20%. Formula 8 relates to Used Leaf Ratio (step 608). It indicates the percentage of allocated leaf pages really in use and should be more than 80%.

The third stage (that is, step 204 or step 440) performs a potential table and index reorganization impact analysis on the tables and indexes left over from the filter stages 1 and 2. A detailed analysis is performed to determine if removing the reason why the table and index reorganization check procedure thinks the table or index should be reorganized, is actually relevant also for the real workload as it is stored in the workload database 16. Preferably, one analysis is performed per table and for each formula of the table and index reorganization check procedure, whereas a further analysis is performed for each statement rated as important due to frequency of execution and execution time—see stage 1 for reference:

Analysis Performed Per Table and for Each of Above Formulae:

If the table reorganization is recommended due to formula 1 (step 502), then it is proposed to consider the table reorganization only if the overflow reads ratio (Overflow Reads/Total Reads) on the table is significant (step 503). The concrete threshold is subject to tests. That means, the table reorganization would not be beneficial if the rows accessed by the workload aren't those that overflow.

If the table reorganization is recommended due to formula 2 (step 504) or formula 3 (step 506), then it is proposed to consider the table reorganization only if the number of table scans on the table is significant (steps 505, 507). The concrete threshold is subject to tests. Thus, there is potential for avoiding page I/O if there would be less empty space on the pages.

For workloads where index scans on a table dominate the reorganization of the table should also be considered if the Hit Ratio in the system is rather low and there is high page I/O on the table. Thus, there is potential for avoiding page I/O on the table even for index scans.

The index reorganization recommended due to formula 4 (step 509), the following is to be taken into account. Since this formula is computed per index but it represents a recommendation for a table, the index reorganization is first checked according to which index a clustering would have the highest effect with regard to the actual workload.

An index is preferred that best matches the following criteria:

An index is not primarily used in index-only access, i.e. when the statement execution uses the index to find the right rows in the table but it has to read data from the table in addition because it is not stored in the index;

An index is used primarily with a low filter factor, i.e. the index is read in a way that it does return a considerable large fraction of the base data as opposed to only return a few or even single row entries;

Optionally: An index is primarily used with range predicates, i.e the index is used to realize SQL predicates like "BETWEEN".

If none of the indexes matches these criteria sufficiently index reorganization is not recommended. Thus, there is potential for lowering the page I/O of sequential prefetching or even switching from list prefetching to sequential prefetching.

If the index reorganization is recommended due to formula 6 (step 604), then the index reorganization should only be considered if this index is used a lot with single keys or small key sets (i.e. a small number of leaf pages are read, step 605). Thus, there is potential of lowering the index access time by having fewer levels to traverse in the tree.

If the index reorganization recommended due to formula 5, formula 7 or formula 8 (steps 602, 606, 608), then index-related index reorganization should only be considered if the workload performs large leaf scans on the index (steps 603, 607, 609). Thus, there is potential of lowering the index page I/O if there are less leaf pages to be read.

Analysis Done Per Statement:

For each important, i.e. high workload statement, it is checked how the plan estimates would improve if the reasons for reorganization had been resolved already. The tables and indexes accessed by a certain statement should only be considered for reorganization if there is a significant improvement of the estimates.

The results of both types of checks are preferably re-merged. A table or index reorganization is recommended (steps 510, 610) if at least one of both checks indicates a potential positive impact.

Referring back to FIG. 4a, the fourth stage 450 performs an actual table and index reorganization impact analysis. The final stage is also optionally to be performed to analyze the actual effect of real table and index reorganization runs. Particularly, it is checked if sudden improvements in the historical time series of certain I/O performance indicators can be correlated with actual table and index reorganization runs—or more specifically with the first RUNSTATS run after that database reorganization.

If this is detected, the tables and indexes of those table and index reorganization runs are noted for future decisions about the table and index reorganization runs. The next time the methods described above indicate a table and index reorganization run, then it is checked if this table already had a table and index reorganization in the past, and if the effect was positive. If the effect was not positive the table and index reorganization is not recommended.

A preferred implementation is when above-mentioned preferred methods are integrated in a database performance management tool, such as for example "Performance Expert" (PE) for the IBM database product DB2.

The following lines out the potential implementation of the approach described above with the prior art tool DB2 Performance Expert (PE). The entire process can be driven by the DB2 PE scheduler framework on e.g. a nightly basis. The result of the process is an advanced table and index reorganization recommendation that will be sent out as a DB2 PE notification. The user can either manually react on it or provide automation by exploiting the user exit for DB2 PE notifications. It will for instance be possible to promote the table and index reorganization notification to a potential hook in the DB2 automatic table maintenance for the database reorganizations. DB2 would then take care of executing the actual database reorganization.

It should be noted that the inventive method can be implemented and delivered also in parts and in specific combinations of the single parts 410, 420, 440, 450 as described with reference to FIG. 4a.

Figure 4B:
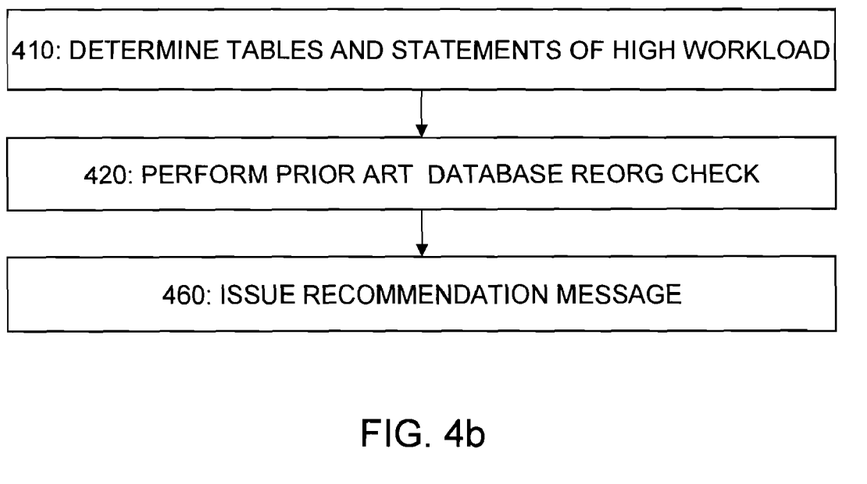
FIG. 4b shows, as an example, the control flow of the most important steps of a second detailed embodiment of the invention.

It is already of significant value if only stage 1 and 2 (identifying important tables and running the table and index reorganization check procedure on them) is implemented; see the embodiment of FIG. 4b. The advantage is to save time for prior art reorganization check procedures, as the check procedure is limited to those tables having high workload.

Figure 4C:
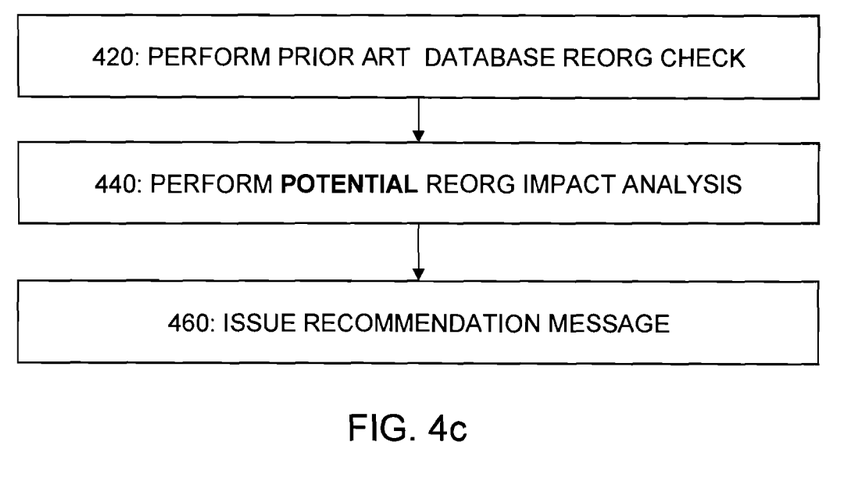
FIG. 4c shows, as an example, the control flow of the most important steps of a third detailed embodiment of the invention.
Figure 4D:
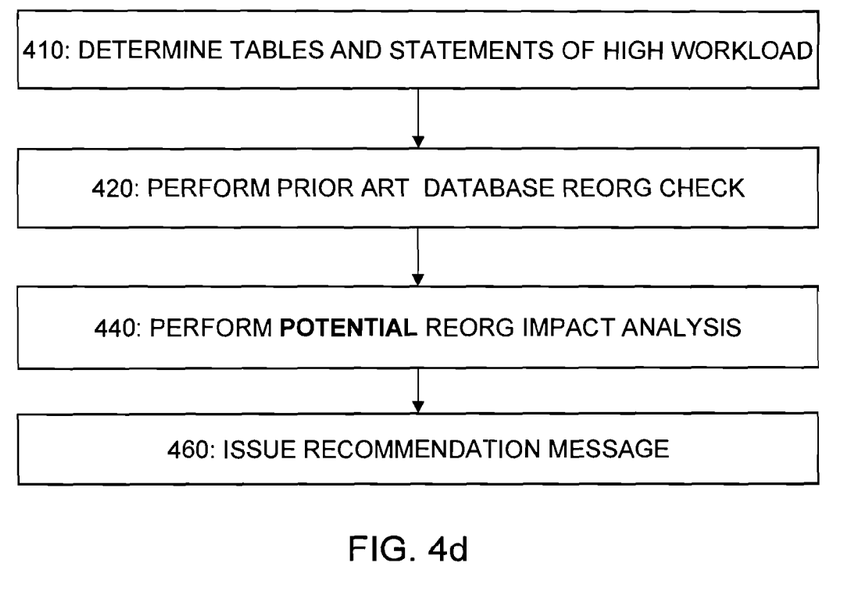
FIG. 4d shows, as an example, the control flow of the most important steps of a fourth detailed embodiment of the invention.

The next optional add-on should be to implement the potential table and index reorganization impact analysis, i.e. stage 3, step 440, see FIG. 4d. The effect of stage 1, +stage 2+stage 3 relative to stage 2+stage 3 only is that the relevant evaluation work is limited in advance to those tables having a high workload; this saves computational time.

In a final add-on the actual table and index reorganization impact analysis 450 completes the method, see again FIG. 4a.

But also, the filtering stage 410 can be omitted, see embodiment of FIG. 4c. The advantage of performing only stage 2 and 3 is to detect, where potential performance increases can be expected, such that no occasions for potential reorganization success are omitted.

Next, some additional details are given for an implementation into DB2, in particular into the built-in tool "Performance Expert" (PE). In more detail, the first stage 410 of workload analysis implemented in DB2, the tool "Performance Expert" (PE) checks the dynamic SQL snapshot data captured over a certain period of time (e.g. if the check is performed daily, this period is the recent 24 hours) for the most important statements, i.e. those statements that are executed many times and those that take long to execute. In the second stage 420 these statements are evaluated to find out the tables and indexes which are important in the sense of high-workload.

Another approach might also be performed in addition to the just described method. It is proposed to analyze table and index metrics available for DB2 via a database monitor—like the IBM DB2 monitor" and the IBM DB2 database management tool "db2pd" which is a DB2 monitoring tool provided with the product itself.

These metrics indicate the important tables directly by stating how frequently rows have been accessed in the tables and how often this has been done by scanning table as opposed to scanning an index on the table.

Combining both approaches, first, the identification of important tables and indexes via considering the most important SQL statements and second, the direct identification of important tables and indexes maximizes the likelihood to not miss important tables and indexes.

The implementation of executing the table and index reorganization check procedure in IBM DB2 can be varied broadly, as there are multiple possibilities for DB2 PE to perform this stage. Firstly, it is possible to run the table and index reorganization check procedure CLP, which is the DB2 Command Line Processor, a tool to issue administrative commands to DB2 via command line. Secondly, it is possible to call the DB2 built-in table and index reorganization check procedures TB_STATS and IX_STATS, which can be called via standard SQL interfaces. Thirdly, it is possible to evaluating the formulae via SQL directly on the catalogue. Calling the CLP utility involves command line parsing by DB2 PE. That is, either the third or the second approach would be the most suitable one for the purpose of the present invention.

The implementation of plan estimate improvement checks should at least consider the following. To check for improvements of plan estimates it is necessary to do what-if "EXPLAIN"s. It should be mentioned that "EXPLAIN" is a built-in tool of IBM DB2 that returns the detailed, internal execution plan for single SQL statements to the caller for informational purposes. What-if EXPLAIN means, the optimizer tool implementing the inventive method must consider fake statistics that pretend that the reasons for the table and index reorganization recommended by the table and index reorganization check procedure are already resolved.

DB2 provides the feature of catalogue simulation, which can be used to achieve the plan estimate improvement check for resolved table and index reorganization reasons. To use that feature one has to copy the entire catalogue tables to a user table space and then switch catalogue simulation to ON. In these copied tables one can now change the statistics values and then invoke the optimizer tool by e.g. issuing an EXPLAIN.

In an implementation of verifying the actual impact, to identify the actual impact DB2 PE would leverage its Trend Analyzer module by calculating the trend of DB2 I/O performance counters. The trend is then checked for change points. Then, in the next step the history of the table and index reorganization runs is analyzed, if the table and index reorganization runs can be timely correlated with the trend curve change points.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A computerised method for determining whether to carry out reorganization of a database storage, the method comprising:
    performing, by workload-aware reorganization check tool in a data processing system, a statistics-based reorganization check procedure on database tables and indexes, resulting in a preliminary reorganization recommendation;
    receiving, by the workload-aware reorganization check tool, information on workload of the database tables and the indexes of the database storage;
    determining, by the workload-aware reorganization check tool, based on the information on workload and the preliminary reorganization recommendation, whether to carry out reorganization of the database storage in accordance with the preliminary reorganization recommendation; and
    determining, by the workload-aware reorganization check tool, a potential effect of the preliminary reorganization recommendation based on a workload performed on the database tables and the indexes, wherein the reorganization is performed in response to at least one ratio being met for both table reorganization and index reorganization indicating the potential effect would be positive.

2. The method of claim 1, further comprising at least one of the following:

determining, by the workload-aware reorganization check tool, the database tables and the indexes based on the information on workload and on a predefined threshold for workload on tables and indexes.

3. The method of claim 1, wherein determining the potential effect of the preliminary reorganization recommendation further comprises:
checking, by the workload-aware reorganization check tool, an overflow reads ratio of the workload, when the preliminary reorganization recommendation is based on an overflow ratio.

4. The method of claim 1, wherein determining the potential effect of the preliminary reorganization recommendation further comprises:
checking, by the workload-aware reorganization check tool, a number of table scans of the workload when the preliminary reorganization recommendation is based on a used space ratio.

5. The method of claim 1, wherein determining the potential effect of the preliminary reorganization recommendation further comprises:
checking, by the workload-aware reorganization check tool, a number of table scans of the workload when the preliminary reorganization recommendation is based on a used pages ratio.

6. The method of claim 1 wherein determining the potential effect of the preliminary reorganization recommendation further comprises:
checking, by the workload-aware reorganization check tool, which index using clustering effects the workload most when the preliminary reorganization recommendation is based on a cluster ratio.

7. The method of claim 1, wherein determining the potential effect of the preliminary reorganization recommendation further comprises:
checking, by the workload-aware reorganization check tool, whether the workload performs large leaf scans on the index, when the preliminary reorganization recommendation is based on at least one of the following:
used space ratio,
pseudo delete ratio, or
used leaf ratio.

8. The method of claim 1, wherein determining the potential effect of the preliminary reorganization recommendation further comprises:
checking, by the workload-aware reorganization check tool, whether a small number of leaf pages are read, when the preliminary reorganization recommendation is based on tree-level-to-space ratio.

9. The method of claim 1, further comprising:
maintaining, by the workload-aware reorganization check tool, information on an effect of reorganization of the database storage in accordance with reorganization recommendations under different workload conditions to be used as a basis in deciding whether to carry out a further reorganization in accordance with a further preliminary reorganization recommendation.

10. A computer program product comprising a computer useable medium having a computer readable program, wherein the computer readable program, when executed on a data processing system, causes the data processing system to:
perform a statistics-based reorganization check procedure on database tables and indexes of a database system, resulting in a preliminary reorganization recommendation;
receive information on workload of the database tables and the indexes of the database storage of the database system;
determine, based on the information on workload and the preliminary reorganization recommendation, whether to carry out reorganization of the database storage in accordance with the preliminary reorganization recommendation; and
determine a potential effect of the preliminary reorganization recommendation based on a workload performed on the database tables and the indexes, wherein the reorganization is performed in response to at least one ratio being met for both table reorganization and index reorganization indicating the potential effect would be positive.

11. The computer program product of claim 10, wherein the computer readable program further causes the data processing system to:
determine the database tables and the indexes based on the information on workload and on a predefined threshold for workload on tables and indexes.

12. The computer program product of claim 10, wherein the computer readable program to determine the potential effect of the preliminary reorganization recommendation further includes computer readable program that causes the data processing system to:
check an overflow reads ratio of the workload, when the preliminary reorganization recommendation is based on an overflow ratio.

13. The computer program product of claim 10, wherein the computer readable program to determine the potential effect of the preliminary reorganization recommendation further includes computer readable program that causes the data processing system to:
check a number of table scans of the workload when the preliminary reorganization recommendation is based on a used space ratio.

14. The computer program product of claim 10, wherein the computer readable program to determine the potential effect of the preliminary reorganization recommendation further includes computer readable program that causes the data processing system to:
check a number of table scans of the workload when the preliminary reorganization recommendation is based on a used pages ratio.

15. The computer program product of claim 10, wherein the computer readable program to determine the potential effect of the preliminary reorganization recommendation further includes computer readable program that causes the data processing system to:
check which index using clustering effects the workload most when the preliminary reorganization recommendation is based on a cluster ratio.

16. The computer program product of claim 10, wherein the computer readable program to determine the potential effect of the preliminary reorganization recommendation further includes computer readable program that causes the data processing system to:
check whether the workload performs large leaf scans on the index, when the preliminary reorganization recommendation is based on at least one of the following:
used space ratio,
pseudo delete ratio, or
used leaf ratio.

17. The computer program product of claim 10, wherein the computer readable program to determine the potential effect of the preliminary reorganization recommendation further includes computer readable program that causes the data processing system to:

check whether a small number of leaf pages are read, when the preliminary reorganization recommendation is based on tree-level-to-space ratio.

18. A system for determining whether to carry out reorganization of a database storage, the system comprising:

a processor; and a memory coupled to the processor, wherein the memory comprises instructions which, when executed by the processor, causes the processor to:

perform a statistics-based reorganization check procedure on database tables and indexes of a database system, resulting in a preliminary reorganization recommendation;

receive information on workload of the database tables and the indexes of the database storage of the database system; and determine, based on the information on workload and the preliminary reorganization recommendation, whether to carry out reorganization of the database storage in accordance with the preliminary reorganization recommendation; and determine a potential effect of the preliminary reorganization recommendation based on a workload performed on the database tables and the indexes, wherein the reorganization is performed in response to at least one ratio being met for both table reorganization and index reorganization indicating the potential effect would be positive.

* * * * *